United States Patent
Chang et al.

(10) Patent No.: US 9,168,831 B2
(45) Date of Patent: Oct. 27, 2015

(54) SYSTEM AND METHOD OF CONTROLLING STARTING OF VEHICLE

(71) Applicants: Hyundai Motor Company, Seoul (KR); Kia Motors Corporation, Seoul (KR)

(72) Inventors: Joseph D Chang, Whasung-Si (KR); Byeong Wook Jeon, Whasung-Si (KR); Dong Hoon Jeong, Whasung-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 22 days.

(21) Appl. No.: 14/104,760

(22) Filed: Dec. 12, 2013

(65) Prior Publication Data

US 2015/0019102 A1 Jan. 15, 2015

(30) Foreign Application Priority Data

Jul. 11, 2013 (KR) .................. 10-2013-0081597

(51) Int. Cl.
  *B60K 28/16* (2006.01)
(52) U.S. Cl.
  CPC ..................... *B60K 28/16* (2013.01)
(58) Field of Classification Search
  USPC ........................................................ 701/82
  See application file for complete search history.

(56) References Cited

U.S. PATENT DOCUMENTS

| 8,392,087 B2 * | 3/2013 | Kodama et al. .................. 701/75 |
| 2008/0243334 A1 * | 10/2008 | Bujak et al. ..................... 701/37 |

FOREIGN PATENT DOCUMENTS

| JP | 3424456 B2 | 7/2003 |
| JP | 2009-299872 A | 12/2009 |
| JP | 2011-149524 A | 8/2011 |
| JP | 2012-81857 A | 4/2012 |
| KR | 1998-053868 A | 9/1998 |
| KR | 10-2010-0052874 A | 5/2010 |

* cited by examiner

*Primary Examiner* — Yonel Beaulieu
(74) *Attorney, Agent, or Firm* — Morgan, Lewis & Bockius LLP

(57) ABSTRACT

A system and a method of controlling vehicle starting may include a wheel speed sensor detecting a speed of at least one wheel among wheels of the vehicle, a vehicle speed detector detecting a vehicle speed, an acceleration detector detecting a vehicle acceleration, a vertical acceleration sensor detecting a vertical acceleration of the vehicle, a wheel torque detector calculating a wheel torque, an ambient temperature sensor detecting an ambient temperature, and a controller. The controller may calculate a wheel slip amount based on the speed of at least one wheel, the vehicle speed and the vehicle acceleration, determine whether a wheel slip occurs by comparing the wheel slip amount with a first predetermined wheel slip amount, determine a road state based on the ambient temperature and the vertical acceleration of the vehicle if the wheel slip occurs, and perform a starting control according to the road state.

19 Claims, 4 Drawing Sheets

FIG.3

| Wheel torque | First predetermined wheel slip amount | Second predetermined wheel slip amount |
|---|---|---|
| 0 | $WS_{slip,0}$ | $WS_{icy,0}$ |
| 5 | $WS_{slip,5}$ | $WS_{icy,5}$ |
| 15 | $WS_{slip,15}$ | $WS_{icy,15}$ |
| 20 | $WS_{slip,20}$ | $WS_{icy,20}$ |
| ... | $WS_{slip,...}$ | $WS_{icy,...}$ |

FIG.4

| Road state | Shift pattern | Control of shfit-speed | Control of torque filter |
|---|---|---|---|
| Slippery road | Normal shift pattern (APS vs Vehicle speed) | Start at high speed | First torque filter |
| Icy road | Hold shift pattern (APS vs Vehicle speed) | Start at high speed | First torque filter |
| Rough road /unpaved road | Hold shift pattern (APS vs Vehicle speed) | Normal (start at first forward speed) | Second torque filter |

SYSTEM AND METHOD OF CONTROLLING STARTING OF VEHICLE

CROSS-REFERENCE TO RELATED APPLICATION

The present application claims priority of Korean Patent Application Number 10-2013-0081597 filed on Jul. 11, 2013, the entire contents of which application are incorporated herein for all purposes by this reference.

BACKGROUND OF INVENTION

1. Field of Invention

The present invention relates to a system and a method of controlling starting of a vehicle. More particularly, the present invention relates to a system and a method of controlling starting of a vehicle which perform a starting control of the vehicle according to a road state.

2. Description of Related Art

Generally, a starting control means a control of an engine and a transmission which is performed when the vehicle begins to run in a stopped state. Serious problems do not occur if the vehicle is started on a normal road, but slip and locking of a wheel may often occur if the vehicle is started on a low-friction road, an icy road, or a rough road.

According to a conventional starting control, a transmission is controlled at a predetermined shift-speed by using a predetermined shift pattern and an engine torque is controlled by using a predetermined torque filter regardless of a road state. Therefore, if a conventional vehicle is started on the low-friction road, the icy road, or the rough road, a driver changes a shift mode to a manual shift mode and manipulates the shift manually, activates a snow mode, or activates or deactivates a traction control. In this case, since the driver must know a suitable manipulation to each road state, an unskilled driver is hard to start the vehicle at a specific road state. In addition, if the driver manipulates incorrectly to each road state, accidents could happen. Therefore, it is necessary to differentiate a starting control according to a road state.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a system and a method of controlling starting of a vehicle having advantages of driving the vehicle safely and conveniently by performing a suitable starting control according to a road state.

A system of controlling starting of a vehicle according to various aspects of the present invention may include: a wheel speed sensor detecting a speed of at least one wheel among wheels of the vehicle; a vehicle speed detector detecting a vehicle speed; an acceleration detector detecting a vehicle acceleration; a vertical acceleration sensor detecting a vertical acceleration of the vehicle; a wheel torque detector calculating a wheel torque; an ambient temperature sensor detecting an ambient temperature; and a controller calculating a wheel slip amount based on the speed of at least one wheel, the vehicle speed and the vehicle acceleration, determining whether a wheel slip occurs by comparing the wheel slip amount with a first predetermined wheel slip amount, determining a road state based on the ambient temperature and the vertical acceleration of the vehicle if the wheel slip occurs, and performing a starting control according to the road state.

The first predetermined wheel slip amount may be set according to the wheel torque. The controller may perform the starting control according to an icy road if the road state is the icy road. The controller may determine that the road state is the icy road if the wheel slip amount is greater than or equal to a second predetermined wheel slip amount and the ambient temperature is lower than or equal to a predetermined temperature in a state that the wheel slip occurs. The second predetermined wheel slip amount may be set according to the wheel torque.

The controller may perform the starting control according to a rough road or an unpaved road if the road state is the rough road or the unpaved road. The controller may determine that the road state is the rough road or the unpaved road if the road state is not the icy road, and the number of times an absolute value of third derivative of the vertical acceleration of the vehicle is greater than a predetermined value is greater than or equal to a predetermined number during a predetermined time in a state that the wheel slip occurs. The controller may perform the starting control according to a slippery road if the road state is not the icy road nor the rough road or the unpaved road in a state that the wheel slip occurs.

A method of controlling starting of a vehicle according to various aspects of the present invention may include: detecting data for a starting control; calculating a wheel slip amount based on the data; determining whether a wheel slip occurs based on the wheel slip amount; determining whether a road state is an icy road if the wheel slip occurs; and performing the starting control according to the icy road if the road state is the icy road.

It may be determined that the wheel slip occurs if the wheel slip amount is greater than a first predetermined wheel slip amount. The first predetermined wheel slip amount may be set according to a wheel torque.

It may be determined that the road state is the icy road if the wheel slip amount is greater than or equal to a second predetermined wheel slip amount and an ambient temperature is lower than or equal to a predetermined temperature in a state that the wheel slip occurs. The second predetermined wheel slip amount may be set according to a wheel torque.

A transmission may be controlled using a normal shift pattern, a shift-speed may be controlled to be higher than or equal to a second forward speed, and an engine torque may be controlled using a first torque filter which is smaller than a normal torque filter in the starting control according to the icy road.

If the road state is not the icy road, the method may further include: determining whether the road state is a rough road or an unpaved road; and performing the starting control according to the rough road or the unpaved road if the road state is the rough road or the unpaved road. It may be determined that the road state is the rough road or the unpaved road if the road state is not the icy road, and the number of times an absolute value of third derivative of the vertical acceleration of the vehicle is greater than a predetermined value is greater than or equal to a predetermined number during a predetermined time in a state that the wheel slip occurs.

A transmission may be controlled using a hold shift pattern, a shift-speed may be controlled to be higher than or equal to a second forward speed, and an engine torque may be controlled using a first torque filter smaller than a normal torque filter in the starting control according to the rough road or the unpaved road.

If the road state is not the rough road or the unpaved road, the method may further include performing the starting control according to a slippery road. A transmission may be controlled using a hold shift pattern, a shift-speed may be controlled to be a first forward speed, and an engine torque may be controlled using a second torque filter that is larger than a normal torque filter and is smaller than a first torque filter in the starting control according to the slippery road.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a table of the first predetermined wheel slip amount and the second predetermined wheel slip amount set according to a wheel torque.

FIG. 4 is a table showing a starting control according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
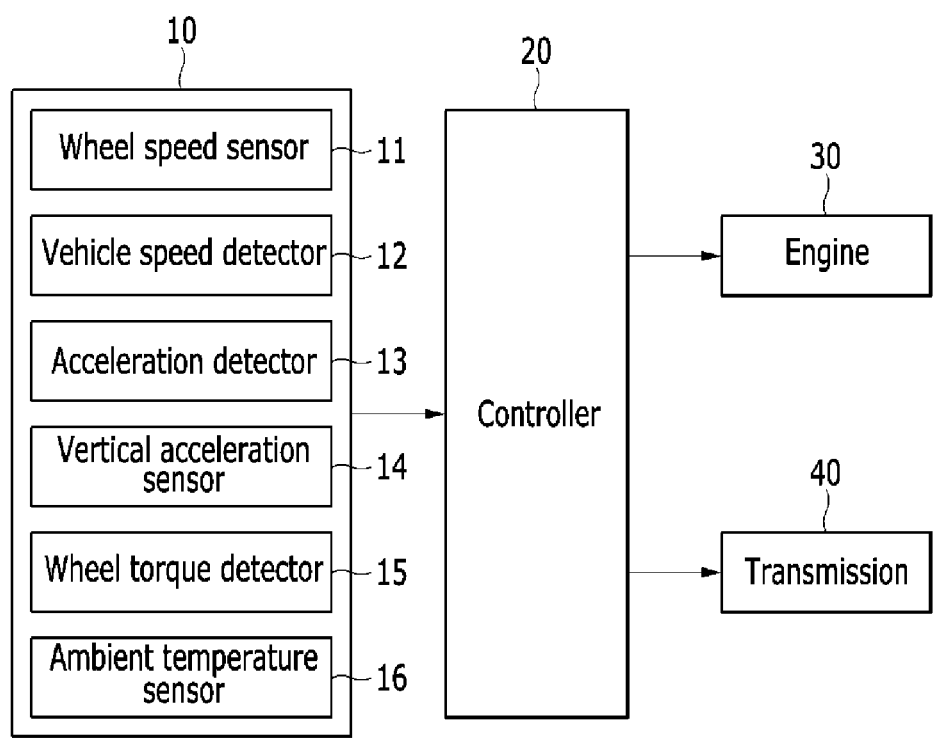
FIG. 1 is a block diagram of a system of controlling starting of a vehicle according to the present invention.

FIG. 1 is a block diagram of a system of controlling starting of a vehicle according to various embodiments of the present invention. As shown in FIG. 1, a system of controlling starting of a vehicle includes a data detector 10, a controller 20, an engine 30 and a transmission 40.

The data detector 10 detects data for a starting control of the vehicle, and the data detected by the data detector 10 is transmitted to the controller 20. The data detector 10 includes a wheel speed sensor 11, a vehicle speed detector 12, an acceleration detector 13, a vertical acceleration sensor 14, a wheel torque detector 15 and an ambient temperature sensor 16.

The wheel speed sensor 11 is mounted at each wheel of the vehicle and detects a speed of each wheel. In this specification, the wheel speed may be a value converted into a vehicle speed. That is, the wheel speed may be defined by multiplying the speed of each wheel and a radius of each wheel. In the conventional vehicle, the wheel speed sensors 11 are mounted respectively at a front left wheel, a front right wheel, a rear left wheel, and a rear right wheel. Herein, a rotation speed of the front left wheel is denoted by a $WheelSpeed_{FL}$, a rotation speed of the front right wheel is denoted by a $WheelSpeed_{FR}$, a rotation speed of the rear left wheel is denoted by a $WheelSpeed_{RL}$ and a rotation speed of the rear right wheel is denoted by a $WheelSpeed_{RR}$.

The vehicle speed detector 12 calculates the vehicle speed from the wheel speed detected by the wheel speed sensor 11. Herein, the vehicle speed may be defined by an average of a plurality of wheel speeds. That is, the vehicle speed VS is calculated from the below equation in a case of the conventional vehicle.

$$VS = \frac{\left(\begin{array}{c} WheelSpeed_{FL} + WheelSpeed_{FR} + \\ WheelSpeed_{RL} + WheelSpeed_{RR} \end{array}\right)}{4} \quad \text{Eq. (1)}$$

Meanwhile, detection of the vehicle speed is not limited to calculation of the vehicle speed from the wheel speed, but the vehicle speed may be detected by an additional speed sensor.

The acceleration detector 13 calculates vehicle acceleration from the vehicle speed. The vehicle acceleration is calculated by a change rate of the vehicle speed. That is, the vehicle acceleration is calculated from the below equation.

$$A_i = \frac{VS_i - VS_{i-1}}{P} \quad \text{Eq. (2)}$$

Herein, $A_i$ indicates the vehicle acceleration at i-th period, $VS_i$ indicates the vehicle speed at i-th period, the $WheelSpeed_{xx,i}$ indicates the wheel speed at i-th period, and P indicates the period. Generally, the period P means the period where the wheel speed sensor 10 detects the wheel speed.

Meanwhile, detection of the vehicle acceleration is not limited to calculation of the vehicle acceleration from the vehicle speed, but the vehicle acceleration may be detected by an additional acceleration sensor.

The vertical acceleration sensor 14 detects a vertical acceleration of the vehicle. In a case of the vehicle provided with an electronic stability program (ESP), the vertical acceleration sensor 14 is mounted basically. However, an additional vertical acceleration sensor 14 may be mounted at the vehicle, if necessary.

The wheel torque detector 15 calculates torque applied to the wheel. The wheel torque can be calculated from an engine torque and a shift-speed currently engaged, but the calculation of the wheel torque is not limited thereto. The wheel torque may be calculated by mounting an additional sensor to the wheel.

The ambient temperature sensor 16 detects an ambient temperature of the vehicle.

The controller 20 is electrically connected to the wheel speed sensor 11, the vehicle speed detector 12, the acceleration detector 13, the vertical acceleration sensor 14, the wheel torque detector 15 and the ambient temperature sensor 16. The controller 20 determines whether a wheel slip occurs from the data detected by the data detector 10, determines a road state if the wheel slip occurs, and performs the starting control by controlling the engine 30 and/or the transmission 40 according to the determined road state. For these purposes, the controller 20 can be realized by one or more processors activated by a predetermined program, and the predetermined program can be programmed to perform each step of a method of controlling starting of a vehicle according to various embodiments of the present invention.

Figure 2:
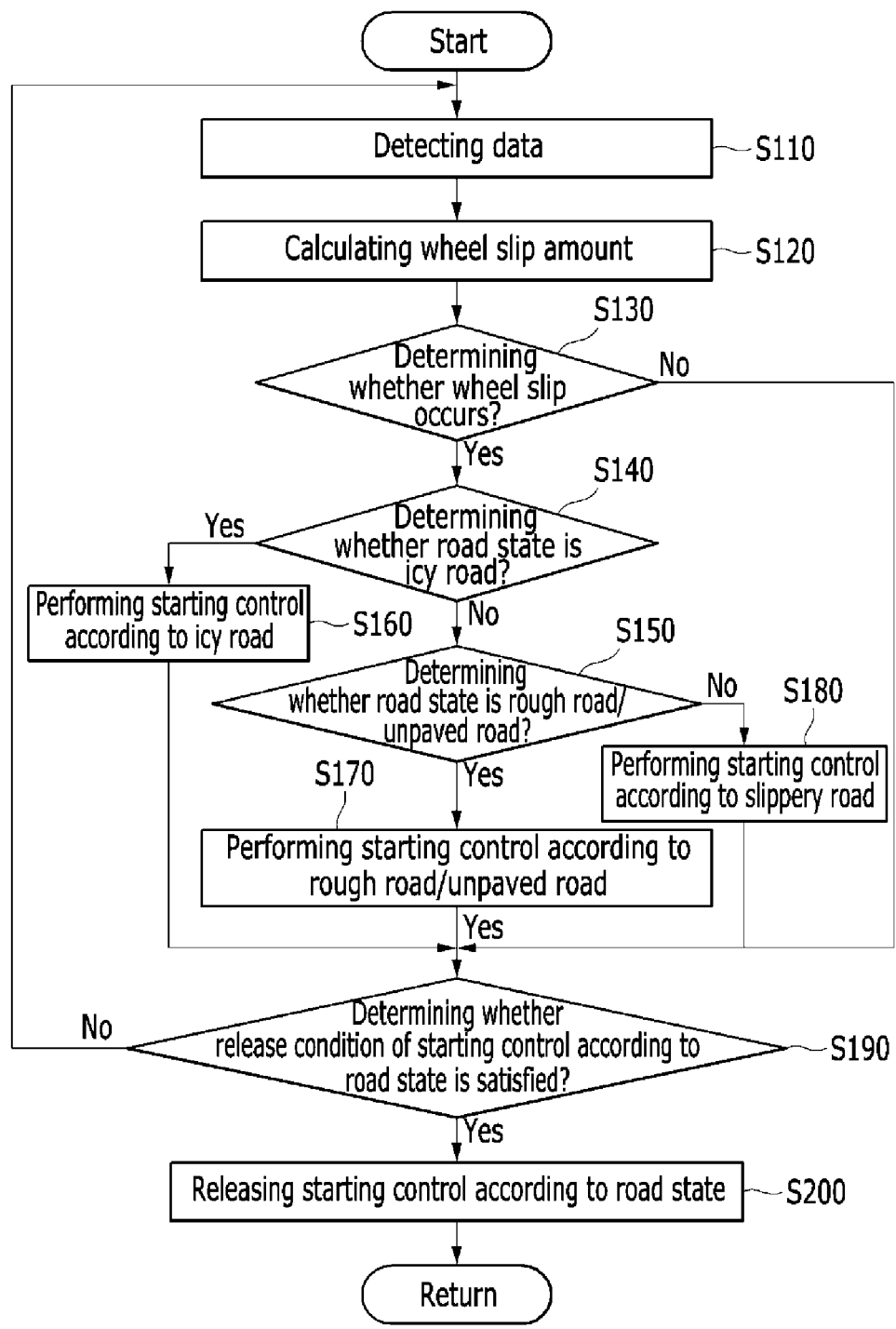
FIG. 2 is a flowchart of a method of controlling starting of a vehicle according to the present invention.

Hereinafter, referring to FIG. 2 to FIG. 4, a method of controlling starting of a vehicle according to various embodiments of the present invention will be described in detail. FIG. 2 is a flowchart of a method of controlling starting of a vehicle according to various embodiments of the present invention;

FIG. 3 is a table of the first predetermined wheel slip amount and the second predetermined wheel slip amount set according to a wheel torque; and FIG. 4 is a table showing a starting control according to various embodiments of the present invention.

As shown in FIG. 2, a method of controlling starting of a vehicle according to various embodiments of the present invention begins with detecting the data for a starting control at step S110. That is, the wheel speed sensor 10 detects the wheel speed, the vehicle speed detector 12 detects the vehicle speed, the acceleration detector 13 detects the acceleration, the vertical acceleration sensor 14 detects the vertical acceleration, the wheel torque detector 15 detects the wheel torque, and the ambient temperature sensor 16 detects the ambient temperature.

If the data detector 10 detects and transmits the data to the controller 20, the controller 20 calculates a wheel slip amount during the starting at step S120. The wheel slip amount is calculated based on the wheel speed, the vehicle speed, and the vehicle acceleration. That is, the wheel slip amount is calculated by subtracting a sum of (i−1)-th vehicle speed and (i−1)-th acceleration from i-th wheel speed. The wheel slip amount of each wheel in the vehicle is calculated. In addition, the wheel slip amount may be calculated only if the vehicle speed is slower than a predetermined vehicle speed.

If the wheel slip amount is calculated, the controller 20 determines whether the wheel slip occurs at step S130. It is determined that the wheel slip occurs if the wheel slip amount is greater than a first predetermined wheel slip amount $WS_{slip,y}$. That is, it is determined that the wheel slip occurs if any one of the below equations is satisfied.

$$\text{WheelSpeed}_{FL,i} - (VS_{i-1} + A_{i-1}) > WS_{slip,y}$$

or $$\text{WheelSpeed}_{FR,i} - (VS_{i-1} + A_{i-1}) > WS_{slip,y}$$

or $$\text{WheelSpeed}_{RL,i} - (VS_{i-1} + A_{i-1}) > WS_{slip,y}$$

or $$\text{WheelSpeed}_{RR,i} - (VS_{i-1} + A_{i-1}) > WS_{slip,y} \quad \text{Eq. (3)}$$

In addition, the first predetermined wheel slip amount, as shown in FIG. 3, may be set according to the wheel torque.

If it is determined that the wheel slip does not occur at the step S130, the controller 20 proceeds to step S190. If it is determined that the wheel slip occurs at the step S130, the controller 20 determines the road state. It is exemplified in this specification and the drawings that the road state is determined to be an icy road, a rough road or an unpaved road and a slippery road in a named sequence, but the determination sequence is not limited to the named sequence.

Firstly, the controller 20 determines whether the road state is the icy road at step S140. That is, the controller 20 determines that the road state is the icy road if the wheel slip amount is greater than or equal to a second predetermined wheel slip amount $WS_{icy,y}$ and the ambient temperature is lower than or equal to a predetermined temperature in a state that the wheel slip occurs. That is, it is determined that the road state is the icy road if any one of the below equations is satisfied in a state that the ambient temperature is lower than or equal to the predetermined temperature.

$$\text{WheelSpeed}_{FL,i} - (VS_{i-1} + A_{i-1}) > WS_{icy,y}$$

or $$\text{WheelSpeed}_{FR,i} - (VS_{i-1} + A_{i-1}) > WS_{icy,y}$$

or $$\text{WheelSpeed}_{RL,i} - (VS_{i-1} + A_{i-1}) > WS_{icy,y}$$

or $$\text{WheelSpeed}_{RR,i} - (VS_{i-1} + A_{i-1}) > WS_{icy,y} \quad \text{Eq. (4)}$$

The second predetermined wheel slip amount, as shown in FIG. 3, may be set according to the wheel torque. In addition, the predetermined temperature may be 0° C.

If it is determined that the road state is the icy road at the step S140, the controller 20 performs the starting control according to the icy road at step S160. As shown in FIG. 4, the transmission is controlled using a normal shift pattern, a shift-speed is controlled to be higher than or equal to a second forward speed, and an engine torque is controlled using a first torque filter that is smaller than a normal torque filter in the starting control according to the icy road. Herein, the normal shift pattern means a shift pattern used when the vehicle runs on a normal road. According to the normal shift pattern, a downshift is performed if an accelerator pedal position value increases at a predetermined speed, and an upshift is performed if a speed increases at a predetermined accelerator pedal position value. In addition, the torque filter means a slope with which torque increases or decreases to target torque, and the normal torque filter means the torque filter basically set in the vehicle.

It is determined that the road state is not the icy road at the step S140, the controller 20 determines whether the road state is the rough road or the unpaved road at step S150. That is, the controller 20 determines that the road state is the rough road or the unpaved road if the road state is not the icy road, and the number of times an absolute value of third derivative of the vertical acceleration of the vehicle is greater than a predetermined value is greater than or equal to a predetermined number during a predetermined time in a state that the wheel slip occurs.

It is determined that the road state is the rough road or the unpaved road at the step S150, the controller 20 performs the starting control according to the rough road or the unpaved road at step S170. As shown in FIG. 4, the transmission is controlled using a hold shift pattern, the shift-speed is controlled to be higher than or equal to the second forward speed, and the engine torque is controlled using the first torque filter that is smaller than the normal torque filter in the starting control according to the rough road or the unpaved road. According to the hold shift pattern, the downshift is not performed even though the accelerator pedal position value increases to a specific accelerator pedal position value at a predetermined speed. That is, the shift does not occur until the accelerator pedal position value changes greatly according to the hold shift pattern.

If it is determined that the road state is not the rough road or the unpaved road at the step S150, the controller 20 determines that the road state is the slippery road and performs the starting control according to the slippery road at step S180. That is, the controller 20 determines that the road state is the slippery road if the road state is not the icy road and the rough road or the unpaved road in a state that the wheel slip occurs.

As shown in FIG. 4, the transmission is controlled using the hold shift pattern, the shift-speed is controlled to be a first forward speed, and the engine torque is controlled using a second torque filter that is greater than the normal torque filter and is smaller than the first torque filter in the starting control according to the slippery road.

During performing the starting control according to the road state, the controller 20 determines whether a release condition of the starting control according to the road state is satisfied at the step S190. The release condition of the starting control according to the road state may be satisfied when the vehicle speed is faster than or equal to a predetermined vehicle speed, or the number of times wheel slip does not occur continuously is greater than or equal to a predetermined number during performing the starting control according to the road state due to occurrence of the wheel slip.

If the release condition of the starting control according to the road state is not satisfied at the step S190, the controller 20 proceeds to the step S110. On the contrary, if the release condition of the starting control according to the road state is satisfied at the step S190, the controller 20 releases the starting control according to the road state at step S200 and finishes the method of controlling the starting according to various embodiments. Therefore, the controller 20 controls the engine 30 and the transmission 40 normally. That is, the controller 20 controls the transmission 40 by using the normal shift pattern and controls the engine 30 by using the normal torque filter and a normal torque map.

As described above, safety may be improved by performing the starting control according to the road state. In addition, since a customer does not need to learn suitable manipulation to each road state, customer convenience may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system of controlling starting of a vehicle comprising:
   a wheel speed sensor detecting a speed of at least one wheel among wheels of the vehicle;
   a vehicle speed detector detecting a vehicle speed;
   an acceleration detector detecting a vehicle acceleration;
   a vertical acceleration sensor detecting a vertical acceleration of the vehicle;
   a wheel torque detector determining a wheel torque;
   an ambient temperature sensor detecting an ambient temperature; and
   a controller determining a wheel slip amount based on the speed of at least one wheel, the vehicle speed and the vehicle acceleration, determining whether a wheel slip occurs by comparing the wheel slip amount with a first predetermined wheel slip amount, determining whether a road state is one of an icy road, a rough road, an unpaved road, or a slippery road based on the ambient temperature and the vertical acceleration of the vehicle if the wheel slip occurs, and performing a starting control according to the determined road state.

2. The system of claim 1, wherein the first predetermined wheel slip amount is set according to the wheel torque.

3. The system of claim 1, wherein the controller performs the starting control according to the icy road if the road state is the icy road.

4. The system of claim 3, wherein the controller determines that the road state is the icy road if the wheel slip amount is greater than or equal to a second predetermined wheel slip amount and the ambient temperature is lower than or equal to a predetermined temperature in a state that the wheel slip occurs.

5. The system of claim 4, wherein the second predetermined wheel slip amount is set according to the wheel torque.

6. The system of claim 1, wherein the controller performs the starting control according to the rough road or the unpaved road if the road state is the rough road or the unpaved road.

7. The system of claim 6, wherein the controller determines that the road state is the rough road or the unpaved road if the road state is not the icy road, and the number of times an absolute value of third derivative of the vertical acceleration of the vehicle is greater than a predetermined value is greater than or equal to a predetermined number during a predetermined time in a state that the wheel slip occurs.

8. The system of claim 1, wherein the controller performs the starting control according to the slippery road if the road state is not the icy road nor the rough road or the unpaved road in a state that the wheel slip occurs.

9. A method of controlling starting of a vehicle comprising:
   detecting data for a starting control;
   determining by a controller a wheel slip amount based on the data;
   determining by the controller whether a wheel slip occurs based on the wheel slip amount;
   determining by the controller whether a road state is an icy road based on ambient temperature if the wheel slip occurs; and
   performing by the controller the starting control according to the icy road if the road state is the icy road.

10. The method of claim 9, wherein it is determined that the wheel slip occurs if the wheel slip amount is greater than a first predetermined wheel slip amount.

11. The method of claim 10, wherein the first predetermined wheel slip amount is set according to a wheel torque.

12. The method of claim 9, wherein it is determined that the road state is the icy road if the wheel slip amount is greater than or equal to a second predetermined wheel slip amount and the ambient temperature is lower than or equal to a predetermined temperature in a state that the wheel slip occurs.

13. The method of claim 12, wherein the second predetermined wheel slip amount is set according to a wheel torque.

14. The method of claim 9, wherein a transmission is controlled using a normal shift pattern, a shift-speed is controlled to be higher than or equal to a second forward speed, and an engine torque is controlled using a first torque filter which is smaller than a normal torque filter in the starting control according to the icy road.

15. The method of claim 9, if the road state is not the icy road, further comprising:
   determining whether the road state is a rough road or an unpaved road; and
   performing the starting control according to the rough road or the unpaved road if the road state is the rough road or the unpaved road.

16. The method of claim 15, wherein it is determined that the road state is the rough road or the unpaved road if the road state is not the icy road, and the number of times an absolute value of third derivative of the vertical acceleration of the vehicle is greater than a predetermined value is greater than or equal to a predetermined number during a predetermined time in a state that the wheel slip occurs.

17. The method of claim 15, wherein a transmission is controlled using a hold shift pattern, a shift-speed is controlled to be higher than or equal to a second forward speed, and an engine torque is controlled using a first torque filter smaller than a normal torque filter in the starting control according to the rough road or the unpaved road.

18. The method of claim 15, if the road state is not the rough road or the unpaved road, further comprising performing the starting control according to a slippery road.

19. The method of claim 18, wherein a transmission is controlled using a hold shift pattern, a shift-speed is controlled to be a first forward speed, and an engine torque is controlled using a second torque filter that is larger than a normal torque filter and is smaller than a first torque filter in the starting control according to the slippery road.

* * * * *